Dec. 27, 1960

D. H. LEBLAIS 2,966,663

MAGNETIC CORE IMPULSE DETECTION DEVICE

Filed May 27, 1955

INVENTOR
DANIEL H. LEBLAIS

BY William V. Schelberg
AGENT

United States Patent Office 2,966,663
Patented Dec. 27, 1960

2,966,663

MAGNETIC CORE IMPULSE DETECTION DEVICE

Daniel H. Leblais, La Varenne-St.-Hilaire, France, assignor to International Business Machines Corporation, New York, N.Y., a corporation of New York Filed May 27, 1955, Ser. No. 511,736
Claims priority, application France Sept. 6, 1954
9 Claims. (Cl. 340—174)

The present invention relates to pulse transfer circuits for performing logical operations and is directed in particular to a device for detecting the coincidence of a plurality of input pulses or the exclusive presence of a single input pulse.

Heretofore, logical circuits of this type have generally employed relay or electron tube elements and have such disadvantages as slow speed operation, high cost or lack of reliability and long life. Through the use of magnetic core elements according to the features of the present invention, an economical device operable at high speed and having increased reliability is produced.

Accordingly, a principal object of the present invention is to provide a logical circuit network capable of detecting the coincidence of several inputs or their exclusive presence through the use of magnetic cores.

Another object of the invention is to provide an improved "exlusive or" circuit employing magnetic binary elements which circuit is operable to deliver an output indication at a controlled time interval.

Still another object of the invention is to provide an improved circuit utilizing magnetc binary elements for detecting the coincidence of electrical impulses.

A more specific object is to provide a logical circuit employing a pair of magnetic cores having series connected input windings so arranged as to induce a magnetic field in one of the cores greater than that induced in the other of said cores.

Other objects of the invention will be pointed out in the following description and claims and illustrated in the accompanying drawings which disclose, by way of example, the principle of the invention and the best mode which has been contemplated of applying that principle.

Binary conditions may be represented by the stable states of remanence attained by magnetic materials and these states may be established and readily controlled by the application of appropriate magnetomotive forces. An ideal material for this purpose has a substantially rectangular hysteresis characteristic such as that illustrated in Fig. 1 where points "*a*" and "*c*" indicate opposite remanence states. Assuming a datum condition is represented by point "*a*" for example, application of a positive magnetizing force H*m*, slightly greater than the coercive force, as by pulsing a winding on a core of the material, causes the hysteresis loop to be traversed from point "*a*" to saturation point "*b*" and then to remanence point "*c*" on termination of the pulse. Point "*c*" then represents the other binary condition as indicated by the pulse. Similarly, with condition "*c*" retained by the material, a pulse developing a negative magnetizing force —*Hm* causes traversal of the loop to point "*a*" through point "*d*." With the binary condition represented by point "*a*" retained by a core and a negative magnetizing force of —*Hm* applied, the loop is traversed form "*a*" to "*d*" and returns to "*a*" when the pulse terminates. Likewise, with a binary condition represented by point "*c*" retained and a positive force +*Hm* applied, the loop is traversed from "*c*" to "*b*" and returns to "*c*" when the pulse terminates.

Application of forces less than the coercive force, as *Hm*/2 for example, are incapable of causing a traversal from "*a*" to "*c*" or vice versa and only negligible flux changes are developed in the core. Also, in going from "*c*" to "*b*" or from "*a*" to "*d*" and vice versa, even with a force of H*m* applied, negligible flux changes are developed. Traversal from "*a*" to "*c*" or from "*c*" to "*a*," however, cause a large flux change and induce significant output voltages in each of the windings on a core of the material.

Figure 2:
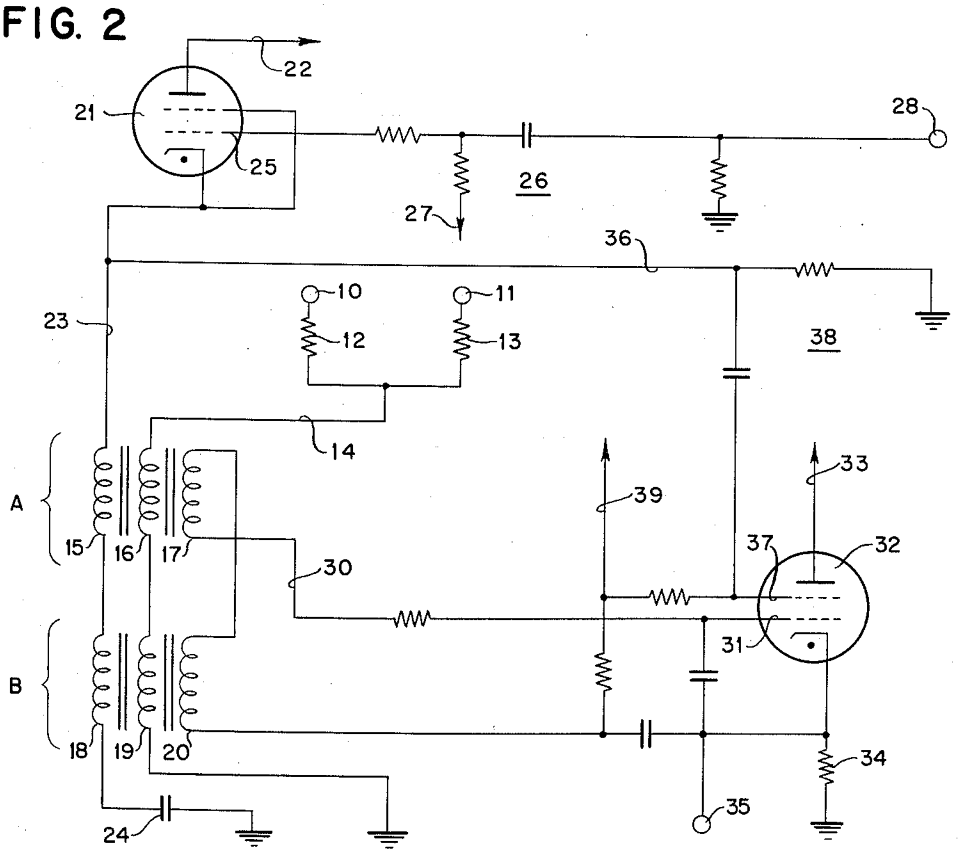
Figure 2 is a schematic representation of a logical circuit employing a pair of magnetic cores.

Referring now to Fig. 2, a circuit for detecting the simultaneous or exclusive presence of two pulses is represented. The pulses to be considered logically, are applied to a pair of input terminals or hubs designated 10 and 11. Resistors 12 and 13, respectively, connect these hubs to a common input lead 14 which is coupled to a pair of magnetic core elements A and B of the type described. Each of these cores is provided with three windings respectively indicated as 15, 16 and 17 for core A and 18, 19 and 20 for core B. Winding 19 comprises approximately twice as many turns as winding 16 with these input windings connected in series between the lead 14 and ground. Windings 15 and 18 are likewise series connected and are provided with an equal number of turns while windings 17 and 20 have an equal number of turns but are coupled in series opposition.

Figure 1:
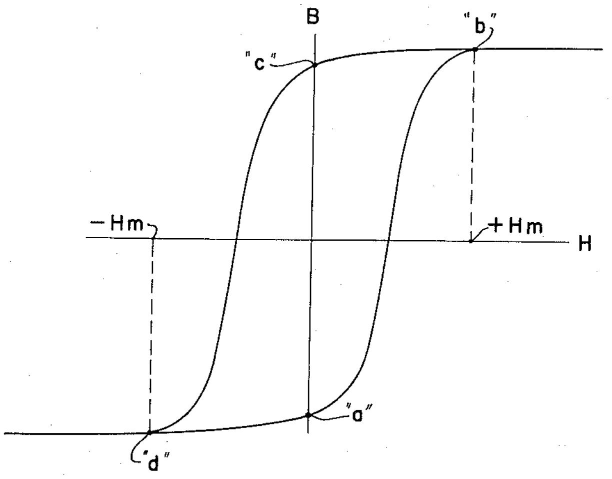
Figure 1 is a representation of the hysteresis characteristic for a magnetic core of the type used in the circuit of this invention.

For purposes of explanation, the cores A and B may be considered as initially set to one remanence state, as for example point "*a*" and the hysteresis loop of Fig. 1. Input windings 16 and 19 are then adapted to provide positive magnetizing forces when pulsed and the sensing or resetting windings 15 and 18 are adapted to provide negative magnetizing forces and to reestablish the cores to a point "*a*" if not already in this state.

Resetting signal pulses are applied to the windings 15 and 18 in series through a thyratron 21 which has its anode coupled to a source of positive voltage (not shown) through a lead 22 and its cathode coupled to the windings 15 and 18 by a lead 23. A return path to the voltage source is provided through a pulse limiting capicitor 24 which is coupled to the lower terminal of winding 18 and grounded as shown. Tube 21 is provided with a control grid 25, conventionally biased through a resistor capacitor network 26 having a source of negative bias applied through a lead 27, and a second grid coupled to the cathode. Controlling signal pulses are applied to the network 26 through a terminal 28 and are adapted to overcome the normally maintained bias.

The output windings 17 and 20 are connected in opposition, as previously mentioned, and are connected by a lead 30 to the control grid 31 of a detector thyratron 32. The anode of tube 32 is connected to a source of supply voltage not shown through a lead 33 with the cathode coupled to a ground return path through a resistor 34. An output terminal 35 is provided coupled to the cathode of the tube 32 with positive pulses developed at this terminal indicating conduction of the tube.

The detector tube 32 may be conditioned to fire only at the moment the cores A and B are sensed or upon energization of the windings 15 and 18, through provision of a circuit 36 connected between the cathode circuit 23 of tube 21 and the second grid 37 of tube 32;

grid 37 having a conventional coupling network 38 with a negative bias applied through a lead 39.

In explaining the manner of operation of the device, the condition of a single input pulse, two input pulses and absence of both input pulses will be considered. First, with one input pulse applied to either terminal 10 or 11, it is directed through the associated resistor 12 or 13 and the lead 14 to energize the windings 16 and 19. Winding 19 has the greater number of turns and develops a field of H*m* magnitude in core B while winding 16 develops a field of *Hm*/2 in core A. Core A is consequently subjected to a field less than the coercive force and remains substantially at the datum residual state represented by point "*a*" on the curve of Fig. 1. On the other hand, core B is subjected to a force greater than the coercive force and is driven from point "*a*" to point "*b*", then returns to "*c*" when the input pulse terminates.

At a selectively determined time, the condition of the cores A and B resulting from reception of only a single input pulse may be sensed by application of a positive signal pulse to terminal 28. This pulse overcomes the bias on grid 25 and causes tube 21 to fire whereupon a pulse is delivered to the series connected windings 15 and 18. Each of these windings has a like number of turns and provides a magnetizing force of —*Hm* magnitude with the result that core A is driven from "*a*" to "*d*" and returns to "*a*" while core B is driven from "*c*" to "*d*" and returns to "*a*." This flux change develops a voltage in winding 20 which is opposed by only a negligible voltage in winding 17 so that the lead 30 is pulsed positively during the sense period. Application of the sensing pulse by firing tube 21 also applies a positive pulse to lead 36, overcoming the bias normally maintained on grid 37 of tube 32. Detector tube 32 is thus conditioned to fire during the sense interval so that upon the appearance of the output pulse on lead 30 and on grid 31, tube 32 fires and a positive output signal appears on the terminal 35. The cores A and B are reset to state "*a*" by this sensing operation and are in proper condition for a subsequent read-in operation.

Without pulses being applied to the input terminals 10 and 11, both cores remain at their datum residual state. A sensing signal applied to terminal 28 fires tube 21 as described above and pulses the windings 15 and 18, however, both cores shift magnetic states only from point "*a*" to point "*d*" and return, during the time interval that tube 32 is conditioned to fire. Only negligible voltages are developed in output windings 17 and 20, so that the tube 32 fails to fire and terminal 35 remains at ground potential. Should a magnetic material be used having a less rectangular hysteresis loop, these voltages would be of greater magnitude, however, since they are opposed proper operation is assured.

A third input condition for consideration is the application of both input signals to the device. With these signals applied simultaneously to terminals 10 and 11, the windings 16 and 19 respectively induce magnetic fields of +*Hm* and +2 *Hm* magnitude and both core A and core B shift from one to the other remanence state. Core A is driven from point "*a*" to point "*b*" and returns to "*c*" while core B is driven from point "*a*" to beyond point "*b*" and return through point "*b*" to point "*c*" on termination of the pulses. With the signals applied in succession, the first pulse to appear causes core B to change remance state as described in connection with the condition of a single input and, thereafter the second pulse provides only sufficient current to provide *Hm*/2 for core A. It is to be noted that it is enough for the impulses applied to terminals 10 and 11 to overlap in time even partly for the device to detect a coincidence and cause both cores to shift states. The period of overlap may be in the order of 3 microseconds or greater for proper operation but obviously depends on the core switching time and may vary with different materials.

Thereafter, under the action of the sensing field, if both cores are shifted from point "*c*" to point "*a*" indicating a coincidence of the pulses, the output windings 17 and 20 develop opposing voltages and the thyratron 32 cannot fire. It is thus demonstrated that the circuit of Fig. 2 fulfills all the requirements of an "exclusive or" circuit and the read out pulses may be applied at any selected time interval after a prescribed read in period is completed.

In the embodiment chosen for illustration, the resistors 12 and 13 have values of about 40,000 ohms and the signal pulses are about 40 volts, delivering a current of approximately 10 milliamperes to the input windings 16 and 19. A maximum sensing field is obtained for 0.6 ampere turns with the windings 15 and 18 each having 10 turns and the thyratron 21 delivering a current in the order of 60 milliamperes. Windings 17 and 20 are provided with 400 turns each and develop an E.M.F. of about 10 volts. It is to be understood that these values are given merely as an example and that other constants may be used within wide limits so that the invention is not to be considered limited to these specific values.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An "exclusive or" logical circuit comprising first and second magnetic storage devices capable of assuming alternate states of magnetic stability representative of binary conditions, a first read in winding means on said first device and adapted to cause said first device to assume a first binary state, a second read in winding means on said second device having a greater number of turns than said first read-in winding means and adapted to cause said second device to assume a first binary state, read out winding means on said devices and adapted to simultaneously cause said devices to assume the other binary state, output winding means on said devices, circuit means coupling said read in winding means in series, and further circuit means coupling said output winding means in series opposition and to a load device.

2. A logical circuit network comprising a pair of storage elements each including a core of magnetic material capable of assuming alternate states of magnetic stability, a read-in winding on each core adapted to be pulsed for causing the storage element to assume one magnetic state, one of said read-in windings having twice the number of turns as the other, a read-out winding on each core adapted to be pulsed for resetting the storage element to the other magnetic state, an output winding on each said core wherein voltage pulses are induced in response to a change in the magnetic state of the storage elements, circuit means connecting said read-in windings in series, and further means connecting said output windings in series opposition and to a load device for developing an output signal when only one of said cores is reset to the other magnetic state.

3. An "exclusive or" logical circuit comprising at least two magnetic cores capable of assuming alternate states of magnetic stability, first winding means on each said core for selectively causing one of said stable states to be assumed, one of said first winding means having a greater number of turns than the other, second winding means on each said core operable for simultaneously causing each said core to assume the other stable state, third winding means on each said core wherein a voltage change is developed in response to a change from one to the other stable state on operation of said second winding means, circuit means connecting said first winding means in series, and further circuit means connecting said third winding means in opposition whereupon an output signal is developed when only one of said cores is in said other stable state and said second winding means is operated.

4. A logical circuit network comprising a pair of storage elements each including a core of magnetic materials capable of assuming alternate states of magnetic stability, a read-in winding on each said core, said read-in windings having an unlike number of turns and being connected in series for causing the storage elements to assume one magnetic state when energized, a read-out winding on each core, said read-out windings having a like number of turns and being adapted to be pulsed simultaneously for resetting the storage elements to the other magnetic state, an output winding on each said core, said output windings having a like number of turns and being connected in series opposition whereupon an output signal is developed when only one of said cores is reset by pulsing of said read-out winding.

5. A saturable core logical circuit comprising at least two magnetic storage elements each including a core of magnetic material capable of assuming alternate stable states of magnetic remanence, means including series connected input windings having an unlike number of turns for causing one of said elements to assume a first stable state in response to one input pulse and for causing both of said elements to assume a first stable state in response to two coincident input pulses, means including reset windings for simultaneously resetting said elements to a second stable state, and means including opposite polarity output windings for developing an output signal in response to operation of said means for resetting when only one of said cores is reset from said first to said second stable state of remanence.

6. A logical circuit network comprising two magnetic storage elements each including a core of magnetic material capable of assuming alternate states of magnetic stability, means including series connected input windings having an unlike number of turns for causing one of said elements to assume a first stable state in response to a single input pulse and for causing both of said elements to assume a first stable state in response to two input pulses applied at least in partial coincidence, means including reset windings for simultaneously resetting said elements to a second stable state, and means for developing an output signal in response to operation of said means for resetting when said one element only is reset, said latter means including an output winding on each of said cores connected in series opposition and having a like number of turns.

7. A saturable core logical circuit comprising two storage elements each including a core of magnetic material capable of assuming alternate stable states of magnetic remanence, means including series connected input windings having an unlike number of turns for causing one of said elements to assume a first stable state in response to a first applied input pulse and for causing the other of said elements to assume a first stable state in response to a second applied input pulse said pulses being applied at least in partial coincidence, means including reset windings for simultaneously resetting both said elements to a second stable state, and means including series connected oppositely poled output windings for developing an output signal in response to operation of said means for resetting when said one element only is reset.

8. A saturable core logical circuit comprising at least two magnetic storage elements each including a core of magnetic material capable of assuming alternate stable states of magnetic remanence, means including series connected input windings having an unlike number of turns for causing one of said elements to assume a first stable state in response to a single input pulse and for causing both said elements to assume a first stable state in response to two input pulses that are at least partially coextensive, means including reset windings for resetting said elements to a second stable state, means including series connected output windings on said cores for developing an output signal when only one of said cores is reset from said first to said second state, and output signal indicating means coupled to said latter means and operable only during the interval that said means for resetting functions.

9. A logical circuit network comprising a pair of magnetic cores capable of attaining one or the other remanence state, a signal winding on each core, one of said signal windings having twice the number of turns as the other, means coupling said signal windings in series and to a source of input pulses, a sense winding on each core having an equal number of turns and poled to apply a magnetizing force to the associated core opposed to that applied by the corresponding signal winding, means for applying a sensing pulse to said sensing windings simultaneously at a selected time, an output winding on each said core having a like number of turns with that output winding on the core having the signal winding of greater turns poled to provide a pulse of desired polarity, and means connecting said output windings in series opposition.

References Cited in the file of this patent

UNITED STATES PATENTS

| | | |
|---|---|---|
| 2,695,993 | Haynes | Nov. 30, 1954 |
| 2,696,347 | Lo | Dec. 7, 1954 |
| 2,794,130 | Newhouse et al. | May 28, 1957 |
| 2,801,344 | Lubkin | July 30, 1957 |
| 2,859,359 | Olson | Nov. 4, 1958 |

OTHER REFERENCES

"Testing Magnetic Decision Elements," by Goodell, Electronics Magazine, January 1954, page 200, Fig. 2 relied on.